United States Patent
Olsson et al.

(10) Patent No.: US 7,269,651 B2
(45) Date of Patent: Sep. 11, 2007

(54) E-BUSINESS OPERATIONS MEASUREMENTS

(75) Inventors: Stig Arne Olsson, Apex, NC (US); David Michael Urgo, Cary, NC (US); Geetha Vijayan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 10/256,094

(22) Filed: Sep. 26, 2002

(65) Prior Publication Data

US 2004/0064546 A1 Apr. 1, 2004

(51) Int. Cl.
*G06F 15/173* (2006.01)
*G06F 15/177* (2006.01)
*G06F 15/16* (2006.01)

(52) U.S. Cl. .............. 709/224; 709/220; 709/228; 709/246

(58) Field of Classification Search .......... 702/186; 709/232–235, 24, 224, 220, 228, 246
See application file for complete search history.

(56) References Cited

U.S. PATENT DOCUMENTS

| | | | |
|---|---|---|---|
| 5,295,244 A | | 3/1994 | Dev et al. |
| 5,459,837 A | * | 10/1995 | Caccavale ............... 709/226 |
| 5,504,921 A | | 4/1996 | Dev et al. |
| 5,581,482 A | * | 12/1996 | Wiedenman et al. ....... 702/186 |
| 5,696,701 A | * | 12/1997 | Burgess et al. ............ 702/186 |
| 5,742,819 A | * | 4/1998 | Caccavale ............... 707/200 |
| 5,787,254 A | | 7/1998 | Maddalozzo, Jr. et al. |
| 5,793,753 A | | 8/1998 | Hershey et al. |
| 5,812,780 A | * | 9/1998 | Chen et al. ............... 709/224 |
| 5,835,756 A | * | 11/1998 | Caccavale ............... 707/1 |
| 5,872,973 A | | 2/1999 | Mitchell et al. |
| 5,978,475 A | | 11/1999 | Schneier et al. |
| 6,000,045 A | | 12/1999 | Lewis |
| 6,041,349 A | | 3/2000 | Sugauchi et al. |
| 6,041,352 A | | 3/2000 | Burdick et al. |
| 6,052,733 A | | 4/2000 | Mahalingam et al. |

(Continued)

OTHER PUBLICATIONS

Paxson et al., "An Architecture for Large-Scale Internet Measurement", 1998, ftp.ee.lbl.gov/papers/nimi-ieee-comm98.ps.gz, pp. 1-9.

(Continued)

*Primary Examiner*—Bunjob Jaroenchonwanit
*Assistant Examiner*—Ramsey Refai
(74) *Attorney, Agent, or Firm*—Stephen J. Walder, Jr.; David A. Mims, Jr.

(57) ABSTRACT

An electronic business operations measurement system and method are provided. The system and method provide a measurement process in which a script is provided for execution by a first probe and a second probe in order to measure the performance of an application. The measurements of the first and second probes may then be mapped to threshold values. The first probe may execute the script on a first data processing device on which the application executes. The second probe may execute the script on a second data processing device remotely located from the first data processing device on which the application executes. The measurements of the performance performed by the second probe may be adjusted, through conversion of the measurement data using a conversion algorithm, to represent a type of network connection for communicating with the application that is common to end users of the application.

37 Claims, 4 Drawing Sheets

U.S. PATENT DOCUMENTS

| | | | |
|---|---|---|---|
| 6,055,493 A * | 4/2000 | Ries et al. | 702/186 |
| 6,070,190 A * | 5/2000 | Reps et al. | 709/224 |
| 6,078,956 A | 6/2000 | Bryant et al. | |
| 6,108,700 A | 8/2000 | Maccabee et al. | |
| 6,141,699 A | 10/2000 | Luzzi et al. | |
| 6,151,688 A | 11/2000 | Wipfel et al. | |
| 6,163,775 A | 12/2000 | Wlaschin et al. | |
| 6,175,832 B1 | 1/2001 | Luzzi et al. | |
| 6,177,886 B1 | 1/2001 | Billington et al. | |
| 6,243,396 B1 | 6/2001 | Somers | |
| 6,269,330 B1 | 7/2001 | Cidon et al. | |
| 6,278,694 B1 * | 8/2001 | Wolf et al. | 370/253 |
| 6,278,966 B1 | 8/2001 | Howard et al. | |
| 6,279,002 B1 * | 8/2001 | Lenz et al. | 707/10 |
| 6,327,550 B1 | 12/2001 | Vinberg et al. | |
| 6,349,325 B1 | 2/2002 | Newcombe et al. | |
| 6,356,205 B1 | 3/2002 | Salvo et al. | |
| 6,397,359 B1 * | 5/2002 | Chandra et al. | 709/224 |
| 6,401,119 B1 | 6/2002 | Fuss et al. | |
| 6,425,006 B1 | 7/2002 | Chari et al. | |
| 6,430,712 B2 | 8/2002 | Lewis | |
| 6,449,739 B1 * | 9/2002 | Landan | 714/47 |
| 6,457,143 B1 | 9/2002 | Yue | |
| 6,499,117 B1 | 12/2002 | Tanaka | |
| 6,510,463 B1 | 1/2003 | Farhat et al. | |
| 6,550,024 B1 | 4/2003 | Pagurek et al. | |
| 6,556,659 B1 | 4/2003 | Bowman-Amuah | |
| 6,587,878 B1 | 7/2003 | Merriam | |
| 6,701,342 B1 | 3/2004 | Bartz et al. | |
| 6,708,137 B2 | 3/2004 | Carley | |
| 6,732,168 B1 | 5/2004 | Bearden et al. | |
| 6,734,878 B1 | 5/2004 | DeLuca et al. | |
| 6,738,933 B2 | 5/2004 | Fraenkel et al. | |
| 6,757,543 B2 | 6/2004 | Moran et al. | |
| 6,760,719 B1 | 7/2004 | Hanson et al. | |
| 6,763,380 B1 | 7/2004 | Mayton et al. | |
| 6,765,864 B1 | 7/2004 | Natarajan et al. | |
| 6,766,278 B2 | 7/2004 | Liu et al. | |
| 6,766,368 B1 | 7/2004 | Jakobson et al. | |
| 6,779,032 B1 | 8/2004 | Hericourt | |
| 6,792,455 B1 | 9/2004 | DeLuca et al. | |
| 6,792,459 B2 | 9/2004 | Elnozahy et al. | |
| 6,801,940 B1 * | 10/2004 | Moran et al. | 709/224 |
| 6,807,156 B1 | 10/2004 | Veres et al. | |
| 6,832,341 B1 | 12/2004 | Vijayan | |
| 6,853,619 B1 * | 2/2005 | Grenot | 370/232 |
| 6,857,020 B1 | 2/2005 | Chaar et al. | |
| 6,859,831 B1 | 2/2005 | Gelvin et al. | |
| 6,868,094 B1 | 3/2005 | Bordonaro et al. | |
| 6,871,324 B2 | 3/2005 | Hand et al. | |
| 6,885,302 B2 | 4/2005 | Seal et al. | |
| 6,889,222 B1 | 5/2005 | Zhao | |
| 6,892,235 B1 | 5/2005 | Daude et al. | |
| 6,901,442 B1 | 5/2005 | Schwaller et al. | |
| 6,904,458 B1 | 6/2005 | Bishop et al. | |
| 6,928,471 B2 | 8/2005 | Pabari et al. | |
| 6,934,745 B2 | 8/2005 | Krautkremer | |
| 6,941,358 B1 | 9/2005 | Joiner et al. | |
| 6,944,673 B2 | 9/2005 | Malan et al. | |
| 6,944,798 B2 | 9/2005 | Stephenson et al. | |
| 6,983,321 B2 | 1/2006 | Trinon et al. | |
| 7,043,549 B2 * | 5/2006 | Breese et al. | 709/224 |
| 7,047,291 B2 | 5/2006 | Breese et al. | |
| 2002/0004828 A1 | 1/2002 | Davis et al. | |
| 2002/0073195 A1 | 6/2002 | Hellerstein et al. | |
| 2002/0087882 A1 | 7/2002 | Schneier et al. | |
| 2002/0097267 A1 | 7/2002 | Dinan et al. | |
| 2002/0161875 A1 | 10/2002 | Raymond | |
| 2003/0061232 A1 | 3/2003 | Patterson | |
| 2003/0093460 A1 | 5/2003 | Kinney et al. | |
| 2003/0120762 A1 | 6/2003 | Yepishin et al. | |
| 2003/0145079 A1 | 7/2003 | Breese et al. | |
| 2003/0145080 A1 * | 7/2003 | Breese et al. | 709/224 |
| 2003/0167406 A1 | 9/2003 | Beavers | |
| 2004/0015846 A1 | 1/2004 | Haisraeli | |
| 2004/0064546 A1 | 4/2004 | Olsson et al. | |
| 2004/0078684 A1 | 4/2004 | Friedman et al. | |
| 2004/0205184 A1 | 10/2004 | Olsson et al. | |

OTHER PUBLICATIONS

Phillips et al., "The FERET Evaluation Methodology for Face-Recognition Algorithms", 1999, sequoyah.ncsl.nist.gov/pub/nist_internal_reports/ir_6264.ps.Z, pp. 1-20.

Ruspini et al., "The Haptic Display of Complex Graphical Environments", 1997, robotics.stanford.edu/people/krasi/Siggraph97.ps.Z, 8 pages.

Blott et al., "User-Level Billing and Accounting in IP Networks", 1999, www.bell-labs.com/user/blott/BLTJ00.pdf, pp. 1-15.

Dykes et al., "An Empirical Evaluation of Client-side Server Selection Algorithms", 2000, www.ieee-infocom.org/2000/papers/700.pdf, 10 pages.

Vigna, "NetSTAT: A Network-based Intrusion Detection Approach", 1998, www.cs.ucsb.edu/~vigna/pub/vigna_kemmerer_acsac98,ps.gz, 10 pages.

Kung et al., "TCP Trunking for Bandwidth Management of Aggregate Traffic", 2000, www.eecs.harvard.edu/~htk/publication/2000-kung-wang-tcp-trunking-1100.pdf, pp. 1-12.

Parulkar, "An Architecture for Monitoring, Visualization and Control of Gigabit Networks", 1997, www.cs.wustl.edu/~schmidt/PDF/NMVC.pdf, pp. 1-21.

Gaidioz et al., "Synchronizing Network Probes to avoid Measurement Intrusiveness with the Network Weather Service", 2000, www.cs.utk.edu/~rich/publications/nws-period.ps.gz, pp. 1-9.

Clark et al., "Application-Level Measurements of Performance on the vBNS", 1999, www.cs.unc.edu/~jeffay/papers/ICMCS-99.ps, 5 pages.

Sekar et al., "A High-Performance Network Intrusion Detection System", 1999, www.seclab.cs.sunysb.edu/sekar/papers/ccs99.ps, 10 pages.

Adiseshu et al., "A State Management Protocol for IntServ, DiffServ, and Label Switching", 1998, www.ccrc.wustl.edu/~hari/icnp.ps, pp. 1-24.

Mercury Interactive Corporation, "Load Testing Monitors," web page available at www.mercuryinteractive.com, 2001.

Mercury Interactive Corporation, "QuickTest Professional," data sheet available at www.mercuryinteractive.com, 2001.

Atesto Technologies, Inc., "How does FuntionChecker work?" web page available at http://www.atesto.com/solutions_func_test_test_how_it_works.asp, 2001.

Atesto Technologies, Inc., "Functional and Regression Testing," web page available at http://www.atesto.com/solutions_automated_fun_test.asp., 2001.

Freshwater Software, "SiteSeer Example Reports," http://www.freshwatersoftware.com/SiteSeerReports.htm, 2001.

Reading Mangement Reports, web page available at http://demo.freshwater.com/SiteScope/docs/History.htm, 2001.

Holistix, "Holistix Web Manager," web page available at http://www.holistix.net/products/webmgr/, 2001.

Holistix, "Holistix Web Manager Reporting," web page available at http://www.holistix.net/products/webmgr/reporting.html, 2001.

Holistix, "Reponse time and performance thresholds," web page available at http://www.holistix.net/products/webmgr/url_response_time_chart.html, 2001.

Holistix, "Correlating response time to site availability," web page available at http://www.holistix.net/products/webmgr/avail_by_monitor.html, 2001.

Keynote, "Test Perspective," web page available at http://www.keynote.com/solutions/html/test_works.html, 2001.

Keynote, "The Keynote Solution," web page available at http://www.keynote.com/solutions/html/resource_transaction_perspecti.html, 2001.

Tweney, "The Need for Speed," *Business 2.0*, vol. 2, No. 7, Aug./Sep. 2001, pp. 144-145.

Chieng, David et al., "Agent-Enhanced Dynamic Service Level Agreement in Future Network Environments", Lecture Notes in Computer Science, vol. 2216, Oct. 29-Nov. 1, 2001. pp. 299-312.

Bhoj, Preeti et al., "SLA Management in Federated Environments", HP Internet Systems and Applications Laboratory, Dec. 1998, pp. 1-12.

Fankhauser, George et al., "Service Level Agreement Trading for the Differentiated Services Architecture", Swiss Federal Institute of Technology, Computer Engineering and Networks Lab, Technical Report No. 59, Nov. 1999, pp. 1-17.

Liu, Zhen et al., "On Maximizing Service-Level-Agreement Profits", ACM Conference on Electronic Commerce, Oct. 14-17, 2001, pp. 213-223.

* cited by examiner

E-BUSINESS OPERATIONS MEASUREMENTS

CROSS-REFERENCES TO RELATED APPLICATIONS, AND COPYRIGHT NOTICE

The present application is related to co-pending applications entitled Method and System for Probing in a Network Environment, application Ser. No. 10/062,329, filed on Jan. 31, 2002, Method and System for Performance Reporting in a Network Environment, application Ser. No. 10/062,369, filed on Jan. 31, 2002, End to End Component Mapping and Problem-Solving in a Network Environment, application Ser. No. 10/122,001, filed on Apr. 11, 2002, and Graphics for End to End Component Mapping and Problem-Solving in a Network Environment, application Ser. No. 10/125,619, filed on Apr. 18, 2002. These co-pending applications are assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to methods and systems for evaluating the performance of information handling in a network environment.

BACKGROUND OF THE INVENTION

Various approaches have been proposed for monitoring, simulating, or testing web sites. Examples include U.S. Pat. No. 6,278,966 B1 (Howard, et al., Aug. 21, 2001), *Method and System for Emulating Web Site Traffic to Identify Web Site Usage Patterns*. However, this example addresses substantially different problems (problems of simulation and hypothetical phenomena), and thus is significantly different from the present invention. Other examples include U.S. Pat. No. 6,078,956 (Bryant, et al., Jun. 20, 2000) and U.S. Pat. No. 5,787,254 (Maddalozzo, et al., Jul. 28, 1998). Other examples include services available from vendors such as Atesto Technologies Inc., Keynote Systems, and Mercury Interactive Corporation. These services may involve a script that runs on a probe computer. The examples mentioned above do not necessarily allow some useful comparisons.

It may be very useful to measure the performance of an application such as a web site, or some other application accessible to a number of users via a network. Concerning two or more such applications, it may be very useful to compare measurements of performance. However, accurate comparisons may be hampered by inconsistent measurements. Inconsistent or heavily customized measurement techniques are common. There are no generally-accepted guidelines or standards for measurement techniques to be used on applications that have been deployed in a production environment. Although the use of a probe is common, there are highly variable parameters for probing, such as values for timeouts, or sampling intervals for example. Inconsistent measurement techniques result in problems such as unreliable performance data, and increased costs for training and administration. Thus there is a need for systems and methods that solve problems related to inconsistent measurement.

SUMMARY OF THE INVENTION

An example of a solution to problems mentioned above comprises: providing a measurement process including: (a) providing a script; (b) setting threshold values; (c) obtaining a first probe's measurement of an applicaton's performance, according to said script; (d) obtaining a second probe's measurement of said application's performance, according to said script; and (e) mapping said measurements to said threshold values; utilizing said measurement process for a plurality of applications; and utilizing substantially the same measurement parameters for said plurality of applications, whereby said plurality of applications may be compared.

Another example of a solution comprises planning an application, setting threshold values, documenting said threshold values, developing said application, and measuring said application's performance against said threshold values. In some cases, such a solution may further comprise deploying said application, providing an operations measurement policy for said application, and providing probing solutions for said application.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"About," with respect to numbers, includes variation due to measurement method, human error, statistical variance, rounding principles, and significant digits.

"Application" means any specific use for computer technology, or any software that allows a specific use for computer technology.

"Availability" means ability to be accessed or used.

"Business process" means any process involving use of a computer by any enterprise, group, or organization; the process may involve providing goods or services of any kind.

"Client-server application" means any application involving a client that utilizes a service, and a server that provides a service. Examples of such a service include but are not limited to: information services, transactional services, access to databases, and access to audio or video content.

"Comparing" means bringing together for the purpose of finding any likeness or difference, including a qualitative or quantitative likeness or difference. "Comparing" may involve answering questions including but not limited to: "Is a measured response time greater than a threshold response time?" Or "Is a response time measured by a remote probe significantly greater than a response time measured by a local probe?"

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Measuring" means evaluating or quantifying.

"Output" or "Outputting" means producing, transmitting, or turning out in some manner, including but not limited to printing on paper, or displaying on a screen, or using an audio device.

"Performance" means execution or doing; for example, "performance" may refer to any aspect of an application's operation, including availability, response time, time to complete batch processing or other aspects.

"Probe" means any computer used in evaluating, investigating, or quantifying the functioning of a component or the performance of an application; for example a "probe" may be a personal computer executing a script, acting as a client, and requesting services from a server.

"Response time" means elapsed time in responding to a request or signal.

"Script" means any program used in evaluating, investigating, or quantifying performance; for example a script may cause a computer to send requests or signals according, to a transaction scenario. A script may be written in a scripting language such as Perl or some other programming language.

"Service level agreement" (or "SLA") means any oral or written agreement between provider and user. For example, "service level agreement" includes but is not limited to an agreement between vendor and customer, and an agreement between an information technology department and an end user. For example, a "service level agreement" might involve one or more client-server applications, and might include specifications regarding availability, response times or problem-solving.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Substantially" means pertaining to essential, material, or important aspects of something. For example, substantially the same measurement parameter would be used in two cases, where there was only a relatively minor difference in the value for a sampling interval, perhaps due to human error or rounding. For example, substantially the same measurement parameter would be used in two cases, where a sampling interval of 14 minutes, 30 seconds was used in the first case, and a sampling interval of 15 minutes was used in the second case, and the preferred range of values for the sampling interval was from about 10 minutes to about 15 minutes.

"Threshold value" means any value used as a borderline, standard, or target; for example, a "threshold value" may be derived from customer requirements, corporate objectives, a service level agreement, industry norms, or other sources.

Figure 1:
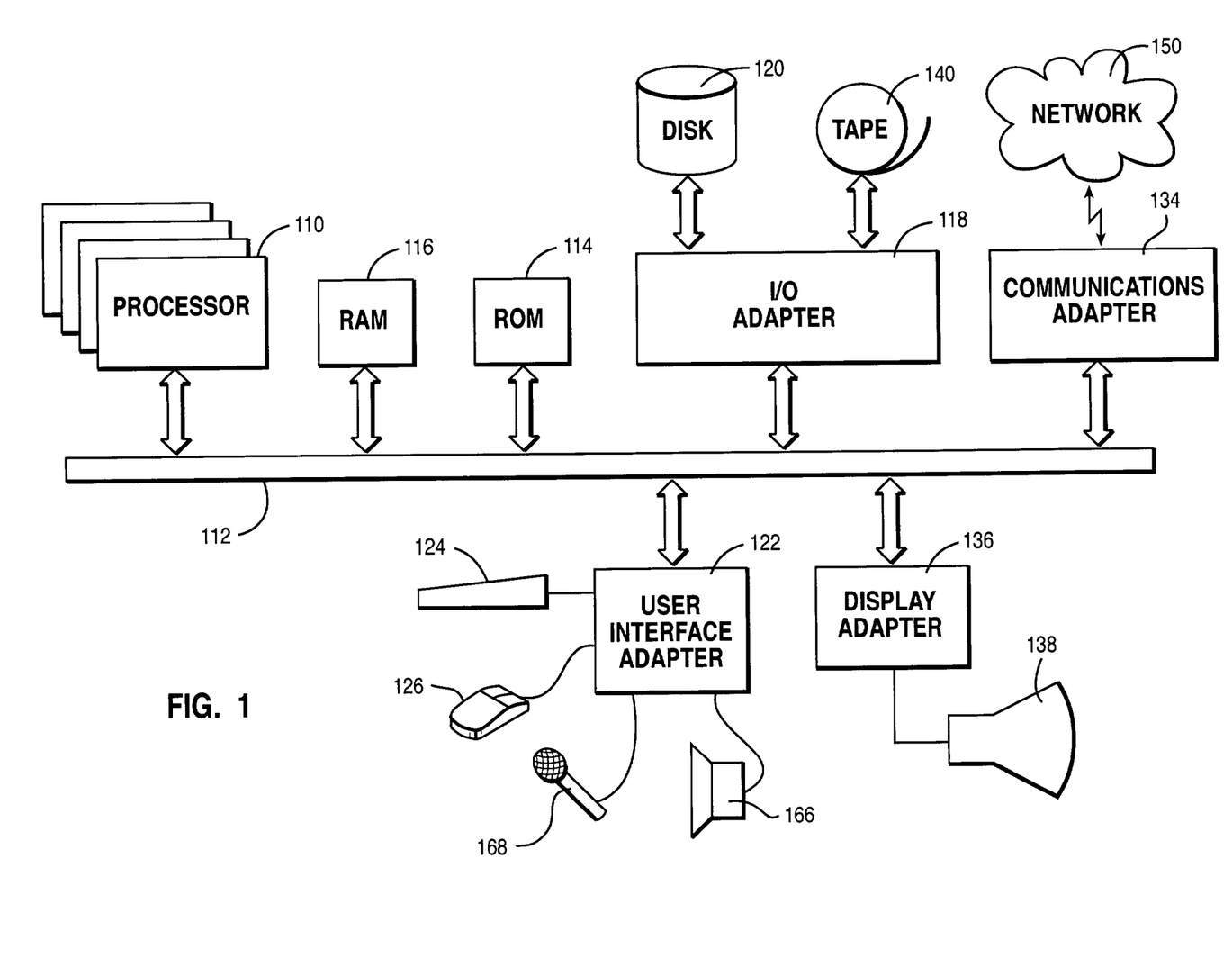
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
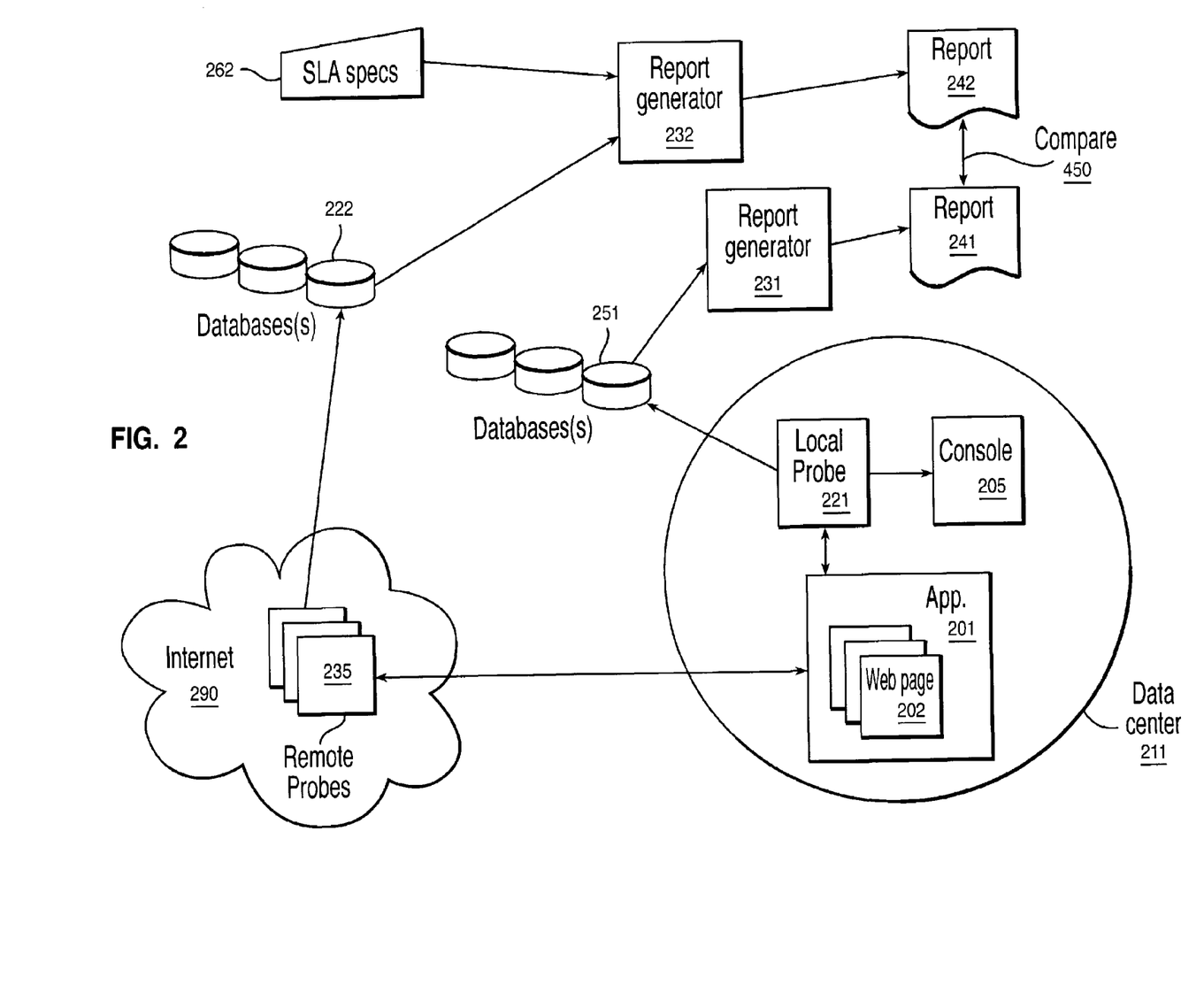
FIG. 2 is a block diagram illustrating one example of how the present invention may be implemented for measuring the performance of one or more applications.

FIG. 2 is a block diagram illustrating one example of how the present invention may be implemented for measuring the performance of one or more applications. To begin with an overview, this example comprises two or more probes, shown at 221 and 235. These probes and their software are means for measuring one or more applicaton's performance (application 201 symbolizes one or more application). FIG. 2 shows means for mapping measurements to threshold values: Remote probes at 235 send to a database 222 the data produced by the measuring process. Report generator 232 and its software use specifications of threshold values (symbolized by "SLA specs" at 262) and create near-real-time reports (symbolized by report 242) as a way of mapping measurements to threshold values. Threshold values may be derived from a service level agreement (symbolized by "SLA specs" at 262) or from customer requirements, corporate objectives, industry norms, or other sources. The same script is deployed on the local and remote probes shown at 221 and 235, to measure the performance of the same application at 201. Different scripts are deployed to measure the performance of different applications at 201.

In the example in FIG. 2, two or more applications may be compared. To give some non-limiting examples from commercial web sites, the applications may comprise: an application that creates customers' orders; an application utilized in fulfilling customers' orders; an application that responds to customers' inquiries; and an application that supports real-time transactions. Probes shown at 221 and 235, or report generators shown at 231 and 232, may comprise means for utilizing substantially the same measurement parameters for the applications. The parameters may further comprise at least one of: sampling interval; timeout period; and prerequisites for rating said application "available."

For example, comparing applications may involve comparing answers to questions such as: What proportion of the time is an application available to its users? How stable is this availability figure over a period of weeks or months? How much time does it take to complete a common transaction step (e.g. a log-on step)?

Turning now to some details of example implementations, a standard policy for operations measurements (appropriate for measuring the performance of two or more applications) was developed. This measurement policy facilitated consistent assessment of IBM's portfolio of e-business initiatives. In a similar way, a measurement policy could be developed for other applications, utilized by some other organization, according to the teachings of the present invention.

This measurement policy was utilized for applications such as: an application that creates customers' orders; an application utilized in fulfilling customers' orders; an application that responds to customers' inquiries; and an application that supports real-time transactions. In other words, this measurement policy was utilized for applications that might affect operations of a business process, for example. Considering another aspect of this example, this measurement policy generally was utilized for customer-facing, web-based applications for which measurement was desired. Considering yet another aspect of this example, this measurement policy was utilized for evaluating measurement service offerings, whether offered within IBM or offered by an outside vendor.

The above-mentioned measurement policy comprised measuring the performance of an application continuously, 7 days per week, 24 hours per day, including an application's scheduled and unscheduled down time. The above-mentioned measurement policy comprised measuring the performance of an application from probe locations (symbolized by probes at 235 in FIG. 2) representative of the customer base of the application.

The above-mentioned measurement policy comprised utilizing a sampling interval of about 15 minutes (sampling 4 times per hour, for example, with an interval of about 15 minutes between one sample and the next). Preferably, a sampling interval of about 10 minutes to about 15 minutes may be used. The sampling interval may be greater than or equal to about 5 minutes. 5 minutes and 10 minutes are examples of intervals that may be used. The sampling interval also may be less than or equal to about 60 minutes. 55 minutes and 60 minutes are examples of intervals that may be used.

The above-mentioned measurement policy comprised probing transaction steps in a business process, and mapping each of said transaction steps to a performance target. For example, response times were measured on a transaction level. These transaction steps could be any steps involved in using an application. Some examples are steps involved in using a web site, a web application, web services, database management software, a customer relationship management system, an enterprise resource planning system, or an opportunity-management business process. Prior to using the measurement policy, each transaction step in a business process was identified and documented. One good way of documenting transaction steps is as follows. For example, transaction steps may be displayed in a table containing the transaction step number, step name, and a description of what action the end user takes to execute the step. For example a row in a table may read as follows. Step number: "NAQS2." Step name: "Log on." Description: "Enter Login ID/Password. Click on Logon button."

The above-mentioned measurement policy comprised adjusting probing in some cases to represent a type of network connection that was common to an application's end users or customer base. A dial-up connection to the Internet, using a modem, or a wireless connection to a communications network, are two examples of users' network connections for which adjustment of probing might be appropriate. For example, probing was adjusted for a client base who used modems to connect to the Internet. Probing was adjusted or throttled to represent the network connection aspect of users' experience. Measurements were presented in this context Considering the modem example in more detail, two groups of modem users were identified: those using 28.8 K modems, and those using faster 56 K modems. Probing was adjusted to reflect the modem speed used by the group with the larger number of users. As an alternative approach, two separate adjustments could be implemented so that both groups of modem users were represented. Continuing the modem example, a service provider connected a probe (symbolized by probes at 235 in FIG. 2) to an Internet Service Provider (ISP) using a T1 connection. The probe utilized algorithms to convert the measurement data to data that was adjusted to represent a modem connection. Probing was adjusted to reflect a particular modem speed.

Continuing with some details of example implementations, for measuring availability, the above-mentioned measurement policy comprised measuring availability of an application from at least two different probe locations. A preferred approach utilized at least two remote probes (symbolized by probes shown at 235), and utilized probe locations that were remote from an application's front end. A local probe and a remote probe (symbolized by probes shown at 221 and 235 in FIG. 2) may be used as an alternative. As mentioned above, probe locations were representative of end users' locations. Regarding sampling intervals for measuring availability, please see the discussion of sampling intervals above.

The above-mentioned measurement policy comprised rating an application or a business process "available," only if each of the transaction steps was successful within a timeout period. In one example, the policy required that each of said transaction steps be successful within approximately 45 seconds of the request, as a prerequisite to rating a business process "available." Transactions that exceeded the 45-second threshold were considered failed transactions, and the business process was considered unavailable. Preferably, a timeout period of about 30 seconds to about 45 seconds may be used. The timeout period may be greater than or equal to about 15 seconds. 15 seconds and 20 seconds are examples of timeout periods that may be used. The timeout period also may be less than or equal to about 60 seconds. 55 seconds and 60 seconds are examples that may be used. Availability was measured on a business process level. A business process was mapped to an availability threshold. Reports (symbolized by report 242 in FIG. 2) were a way of mapping measurements to threshold values. Threshold values may be derived from a service level agreement (symbolized by "SLA specs" at 262) or from customer requirements, corporate objectives, or other sources.

Continuing with some details of example implementations, the same script was deployed on the local and remote probes, to measure the performance of the same application 201. (Two versions of a script could be considered to be the same script, if they differed slightly in software settings for example, such as settings for the above-mentioned algorithms to convert the measurement data to data that was adjusted to represent a modem connection.) The local probe 221 provided information that excluded the Internet, while the remote probes 235 provided information that included the Internet (shown at 290). Thus, the information could be compared to determine whether performance or availability problems were a function of application 201 itself (infrastructure-specific or application-specific), or a function of the Internet 290. In example implementations, probes measured response time for requests. The double-headed arrow connecting remote probes at 235 with application 201 symbolizes requests and responses. The double-headed arrow connecting local probe 221 with application 201 symbolizes requests and responses.

Continuing with some details of example implementations, we located application probes locally at hosting sites (e.g. local probe shown at 221, within data center 211) and remotely at relevant end-user sites (remote probes at 235). This not only exercised the application code and application hosting site infrastructure, but also probed the ability of the application and network to deliver data from the application hosting site to the remote end-user sites. End-to-end measurement of IBM external applications (symbolized by application 201 with web pages 202) for customers or business partners, for example, involved remote application probes (RAP's) on the Internet (remote probes at 235 shown within Internet 290). While we measured the user availability and performance from a customer perspective (remote probes at 235), we also measured the availability and performance of the application at the location where it was deployed (local probe shown at 221, within data center 211). This provided baseline performance measurement data, that could be used for analyzing the performance measurements from the remote probes (at 235).

In one example, Local probe 221 was implemented with a personal computer, utilizing IBM's Enterprise Probe Platform technology, but other kinds of hardware and software could be used. A local probe 221 was placed on the IBM network just outside the firewall at the center where the web site was hosted. A local probe 221 was used to probe one specific site per probe. There could be multiple scripts per site. A local probe 221 executed the script every 20 minutes, in one example. Intervals of other lengths also could be used. Please see the discussion of sampling intervals above. In one example, local application probe 221 automatically sent events to the management console 205 used by the operations department.

In one example, Local probe 221 sent to a database 251 the data produced by the measuring process. Database 251 was implemented by using IBM's DB2 technology, but other database management software could be used, such as ORACLE, INFORMIX, SYBASE, MYSQL, Microsoft Corporation's SQL SERVER, or similar software. For local probe data, an automated reporting tool (shown as report generator 231) ran continuously at set intervals, obtained data from database 251, and sent reports 241 via email to these IBM entities: the web site owner, the hosting center, and IBM's world wide command center. Reports 241 also could be posted on a web site at the set intervals. Report generator 231 was implemented by using the Perl scripting language and the AIX operating system. However, some other programming language could be used, and another operating system could be used, such as LINUX, or another form of UNIX, or some version of Microsoft Corporation's WINDOWS, or some other operating system. Note that in an alternative example, report generator 231 might obtain data from databases at 251 and at 222, then generate reports 241 and 242.

In one example, remote probes at 235 were implemented by contracting for probing services available from Mercury Interactive Corporation, but services from another vendor could be used, or remote probes could be implemented by other means (e.g. directly placing probes at various Internet Service Providers (ISP's)). A remote probe 235 may be used to probe one specific site per probe; a probe also has the capability of probing multiple sites. There could be multiple scripts per site. Remote probes 235 were located at various ISP's in parts of the world that the web site (symbolized by application 201) supported. In one example, a remote probe 235 executed the script every 60 minutes. Intervals of other lengths also could be used. Please see the discussion of sampling intervals above. If multiple remote probes at 235 are used, probe execution times may be staggered over the hour to ensure that the performance of the web site is being measured throughout the hour. Remote probes at 235 sent to a database 222 the data produced by the measuring process. In one example, Database 222 was implemented by using Mercury Interactive's database, but other database management software could be used, such as IBM's DB2, ORACLE, INFORM IX, SYBASE, MYSQL, Microsoft Corporation's SQL SERVER, or similar software. In one example, report generator 232 was implemented by using Mercury Interactive's software and web site, but another automated reporting tool could be used, such as the one described above for local probe data (shown as report generator 231). IBM's arrangement with Mercury Interactive included the following: Mercury Interactive's software at 232 used IBM's specifications (symbolized by "SLA specs" at 262) and created near-real-time reports (symbolized by report 242) in a format required by IBM; IBM's specifications and format were protected by a confidential disclosure agreement; the reports at 242 were supplied in a secure manner via Mercury Interactive's web site at 232; access to the reports was restricted to IBM entities (the web site owner, the hosting center, and IBM's world wide command center).

Turning now to some details of collecting data from a plurality of probes, Component Probes measure availability, utilization and performance of infrastructure components, including servers, LAN, and services. Local component probes (LCP's) may be deployed locally in hosting sites, service delivery centers or data centers (e.g. at 211). Network Probes measure network infrastructure response time and availability. Remote Network Probes (RNP's) may be deployed in a local hosting site or data center (e.g. at 211) if measuring the intranet or at Internet Service Provider (ISP) sites if measuring the Internet.

Application Probes measure availability and performance of applications and business processes.

Local Application Probe (LAP): Application probes deployed in a local hosting site or data center (e.g. at 211) are termed Local Application Probes.

Remote Application Probe (RAP): An application probe deployed from a remote location is termed a Remote Application Probe.

The concept of "probe" is a logical one. Thus for example, implementing a local application probe could actually consist of implementing multiple physical probes.

Providing a script for a probe would comprise defining a set of transactions that are frequently performed by end users. Employing a plurality of probes would comprise placing at least one remote probe (shown at 235 in FIG. 2) at each location having a relatively large population of end users. Note that the Remote Application Probe transactions and Local Applicaton Probe transactions should be the same transactions. The example measured all the transactions locally (shown at 221), so that the local application response time can be compared to the remote application response time. (The double-headed arrow at 450 symbolizes comparison.) This can provide insight regarding application performance issues. End-to-end measurement of an organization's internal applications for internal customers may involve a RAP on an intranet, for example, whereas end-to-end measurement of an organizaton's external applications for customers, business partners, suppliers, etc. may involve a RAP on the Internet (shown at 235). The example in FIG. 2 involves defining a representative transaction set, and deploying remote application probes (shown at 235) at relevant end-user locations.

This example in FIG. 2 is easily generalized to other environments besides web-based applications. Application 201 symbolizes one or more applications of various kinds. The one or more applications at 201 may be any client-server application, for example. Some examples are a web site, a web application, database management software, a customer relationship management system, an enterprise resource planning system, or an opportunity-management business process where a client directly connects to a server.

Figure 3:
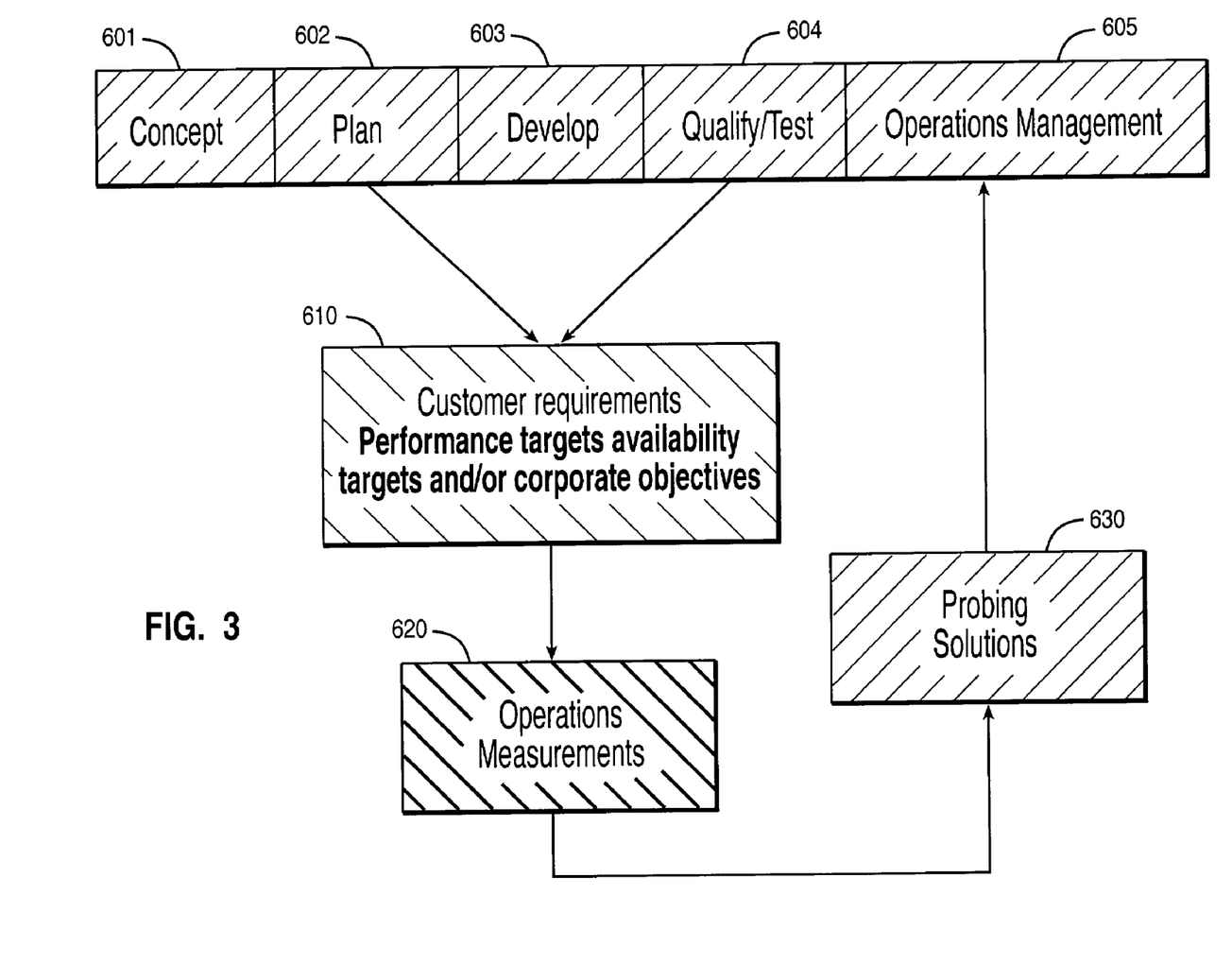
FIG. 3 is a block diagram illustrating one example of how the present invention may be utilized in developing and deploying an application.

FIG. 3 is a block diagram illustrating one example of how the present invention may be utilized in developing and deploying an application. Beginning with an overview, blocks 601, 602, 603, and 604 symbolize an example of a typical development process for an application (a web-based business application for example). This example begins with a concept phase at block 601, followed by a planning phase, block 602, and a development phase at block 603. Following a qualifying or testing phase at block 604, the application is deployed and the operations management phase is entered, at block 605.

Blocks 602 and 610 are connected by an arrow, symbolizing that in the planning phase, customer requirements at 610 (e.g. targets for performance or availability) are understood and documented. Thus block 610 comprises setting threshold values, and documenting the threshold values. Work proceeds with developing the application at block 603. The documented threshold values may provide guidance and promote good design decisions in developing the application. Once developed, an application is evaluated against the threshold values. Thus the qualifying or testing phase at block 604, and block 610, are connected by an arrow, symbolizing measuring the application's performance against the threshold values at 610. This may lead to identifying an opportunity to improve the performance of an application, in the qualifying or testing phase at block 604.

As an application is deployed into a production environment, parameters are established to promote consistent measurement by probes. Thus the example in FIG. 3 further comprises: deploying the application (transition from qualifying or testing phase at block 604 to operations at block 605), providing an operations measurement policy for said application (at block 620), and providing probing solutions for said application (at block 630). Blocks 620, 630, and 605 are connected by arrows, symbolizing utilization of a measurement process or measurement policy at 620, and utilization of probing solutions at 630, in managing the operation of an application at 605. This may lead to identifying an opportunity to improve the performance of an application, in the operations management phase at 605.

In the example in FIG. 3, documentation of how to measure performance in a production environment is integrated with a development process. Block 620 may involve a measurement policy. Examples involving a measurement policy are described above in connection with FIG. 2. Probing solutions at block 630 are described above in connection with probes shown at 221 and 235 in FIG. 2. Block 620 may involve a measurement process, comprising providing a script, obtaining a first probe's measurement of an application's performance, according to said script, obtaining a second probe's measurement of said application's performance, according to said script, and mapping said measurements to said threshold values. Such a measurement process is described below in connection with FIG. 4.

Figure 4:
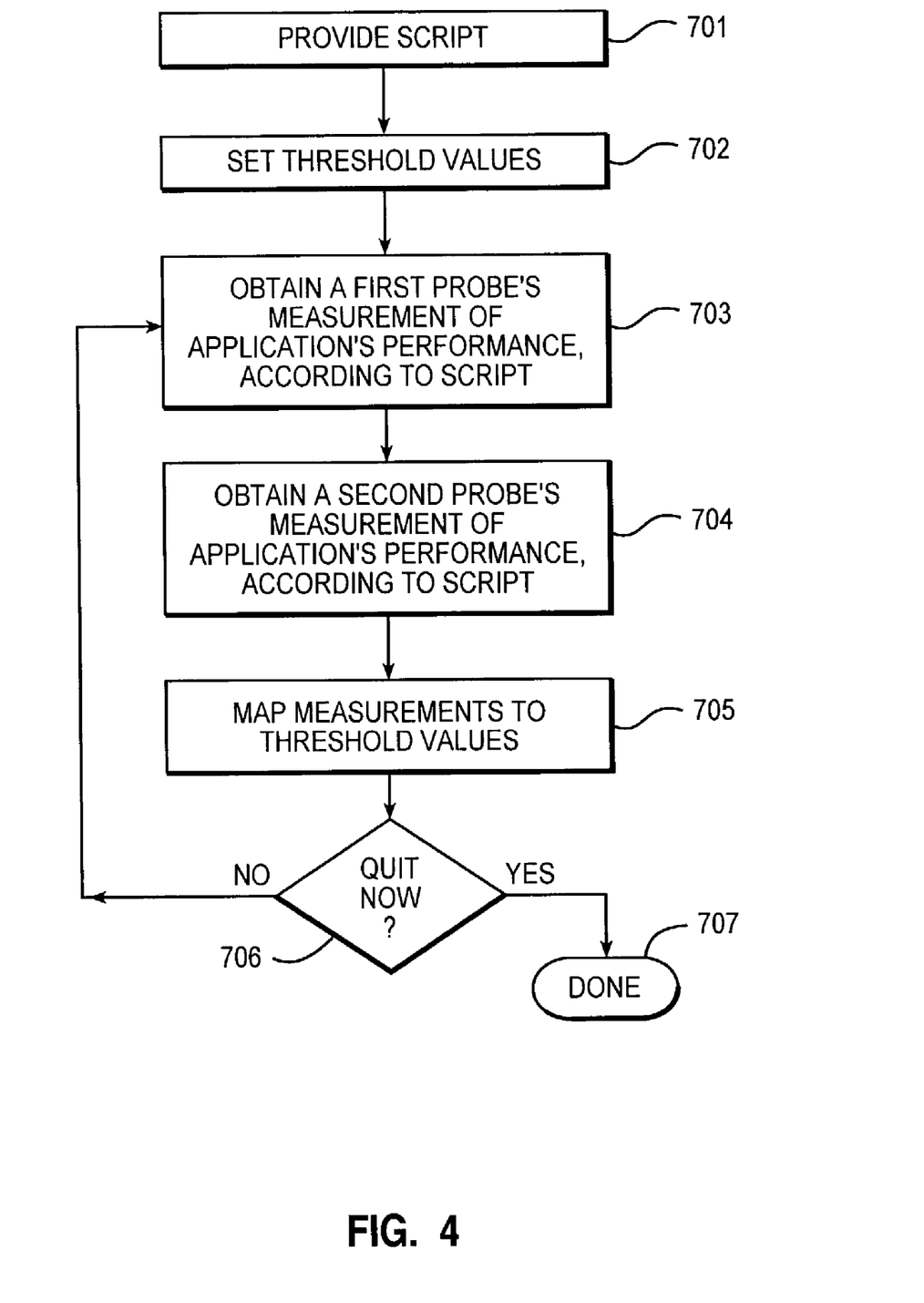
FIG. 4 is a flow chart illustrating an example of a measurement process, according to the teachings of the present invention.

FIG. 4 is a flow chart illustrating an example of a measurement process, according to the teachings of the present invention. For example, such a measurement process may be utilized for two or more applications, whereby those applications may be compared; or such a measurement process may be integrated with a software development process as illustrated in FIG. 3. The example in FIG. 4 begins at block 701, providing a script. Providing a script may comprise defining a set of transactions that are frequently performed by end users. Providing a script may involve decomposing an actual business process. The business process may for example: represent the most common tasks performed by the end users, exercise major components of the applications, cover multiple hosting sites, cross multiple applications, or involve specific infrastructure components that should be monitored on a component level. Using a script, local and remote application probes may measure the end-to-end user experience for repeatable transactions, either simple or complex. End-to-end measurements focus on measuring the business process (as defined by a repeatable sequence of events) from the end user's perspective. End-to-end measurements tend to cross multiple applications, services, and infrastructure. Examples would include: create an order, query an order, etc. Ways to implement a script that runs on a probe are well-known; vendors provide various services that involve a script that runs on a probe.

Block 702 represents setting threshold values. Threshold values may be derived from a service level agreement [SLA], or from sources shown in FIG. 3, block 610, such as customer requirements, targets for performance or availability, or corporate objectives for example.

Operations at 703, 704, and 705 were covered in the description given above for FIG. 2. These operations are: block 703, obtaining a first probe's measurement of an application's performance, according to the script; block 704, obtaining a second probe's measurement of said application's performance, according to the script; block 705, mapping said measurements to said threshold values. Reports provide a way of mapping measurements to threshold values. For example, consider a report in the form of a table. In each column, response times for a transaction step may be compared with a corresponding threshold value. For example, there may be a column for a "Log on" step. For that step, the "Log on" column may display a threshold value, and report response times. The response times may be the results of each script execution by a plurality of probes. For an example concerning availability, there may be a column for an availability rating. For a certain business process, an "availability" column may display the results of each script execution by a plurality of probes, or an "availability" column may display a summary of results compared with a threshold value.

Operations at 703, 704, and 705 may be performed repeatedly (shown by the "No" branch being taken at decision 706 and the path looping back to block 703) until the process is terminated (shown by the "Yes" branch being taken at decision 706, and the process terminating at block 707).

Regarding FIGS. 3 and 4, the order of the operations in the processes described above may be varied. For example, it is within the practice of the invention for block 702, setting threshold values, to occur before, or simultaneously with, block 701, providing a script. Those skilled in the art will recognize that blocks in FIGS. 3 and 4, described above, could be arranged in a somewhat different order, but still describe the invention. Blocks could be added to the above-mentioned diagrams to describe details, or optional features; some blocks could be subtracted to show a simplified example.

In conclusion, we have shown examples of solutions to problems that are related to inconsistent measurement.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A method, in a distributed data processing system having at least one network, for evaluating an operation of an application executing on a data processing device, comprising:

measuring at least one performance parameter of the application using a first probe that executes a script on a first data processing device on which the application executes, wherein the script measures the at least one performance parameter of the application;

measuring the at least one performance parameter of the application using a second probe that executes the script on a second data processing device remotely located from the first data processing device on which the application executes, wherein execution of the script on the second data processing device causes transactions to be performed across the at least one network;

adjusting the measurements of the at least one performance parameter performed by the second probe to represent a type of network connection for communicating with the application that is common to end users of the application by converting measurement data using at least one conversion algorithm;

setting threshold values for the at least one performance parameter;

mapping the measurements of the at least one performance parameter performed by the first probe and the second probe to the threshold values; and outputting an indication of an evaluation of an operation of the application based on the mapping of the measurements of the at least one performance parameter performed by the first probe and the second probe to the threshold values.

2. The method of claim 1, wherein the first probe and second probe measure the at least one performance parameter using measurement parameters that comprise at least one of:

sampling interval;

timeout period; and prerequisites for rating said application "available."

3. The method of claim 2, wherein:

the sampling interval ranges from about 5 minutes to about 60 minutes.

4. The method of claim 1, wherein the at least one performance parameter comprises at least one of a response time for at least one request sent to the application or a measurement of availability of the application.

5. The method of claim 1, further comprising:

measuring the at least one performance parameter of the application using a third probe that executes a script on a third data processing device remotely located from the first data processing device on which the application executes, wherein execution of the script on the third data processing device causes transactions to be performed across the at least one network; and mapping the measurements of the at least one performance parameter performed by the third probe to the threshold values, wherein outputting an indication of an evaluation of an operation of the application is further based on the mapping of the measurements of the at least one performance parameter performed by the third probe to the threshold values.

6. The method of claim 5, wherein times of execution of the script by the second probe and the third probe are staggered with respect to one another.

7. The method of claim 1, wherein outputting an indication of an evaluation of an operation of the application comprises rating the application "available," only if each of a plurality of transaction steps in processing a request sent to the application is successful within a timeout period.

8. The method of claim 7, wherein:

the timeout period ranges from about 15 seconds to about 60 seconds.

9. The method of claim 1, wherein the first probe and second probe execute the script for measuring the at least one performance parameter for a plurality of applications executing on the first data processing device, wherein the same at least one performance parameter is measured for each of the plurality of applications, and wherein outputting an indication of an evaluation of an operation of the application comprises comparing measured performance parameters of the application with measured performance parameters of at least one other application executing on the first data processing device.

10. The method of claim 1, wherein the script executed by the first probe and the second probe measures the at least one performance parameter for each transaction step of a plurality of transaction steps of a transaction with the application.

11. The method of claim 10, wherein outputting an indication of an evaluation of an operation of the application further comprises:
generating a table display output containing a plurality of table entries, one table entry for each transaction step in the transaction, wherein each table entry comprises a transaction step number, a transaction step name, and a description of an action an end user takes to execute the transaction step.

12. A system for evaluating an operation of an application executing on a data processing device, comprising:
means for setting threshold values for the at least one performance parameter;
a plurality of probes comprising at least one local probe and at least one remote probe;
means for measuring at least one performance parameter of the application using the at least one local probe that executes a script on a first data processing device on which the application executes, wherein the script measures the at least one performance parameter of the application;
means for measuring the at least one performance parameter of the application using the at least one remote probe that executes the script on a second data processing device remotely located from the first data processing device on which the application executes, wherein execution of the script on the second data processing device causes transactions to be performed across at least one network;
means for adjusting the measurements of the at least one performance parameter performed by the at least one remote probe to represent a type of network connection for communicating with the application that is common to end users of the application by converting measurement data using at least one conversion algorithm;
means for mapping the measurements of the at least one performance parameter performed by the at least one local probe and the at least one remote probe to the threshold values; and
means for outputting an indication of an evaluation of an operation of the application based on the mapping of the measurements of the at least one performance parameter performed by the at least one local probe and the at least one remote probe to the threshold values.

13. The system of claim 12, wherein the at least one local probe and at least one remote probe measure the at least one performance parameter using measurement parameters that comprise at least one of:
sampling interval;
timeout period; and
prerequisites for rating said application "available."

14. The system of claim 12, wherein:
the sampling interval ranges from about 5 minutes to about 60 minutes.

15. The system of claim 12, wherein the at least one performance parameter comprises at least one of a response time for at least one request sent to the application or a measurement of availability of the application.

16. The system of claim 12, comprising:
means for measuring the at least one performance parameter of the application using a third probe that executes a script on a third data processing device remotely located from the first data processing device on which the application executes, wherein execution of the script on the third data processing device causes transactions to be performed across the at least one network; and
means for mapping the measurements of the at least one performance parameter performed by the third probe to the threshold values, wherein the means for outputting an indication of an evaluation of an operation of the application is further based on the mapping of the measurements of the at least one performance parameter performed by the third probe to the threshold values.

17. The system of claim 16, wherein times of execution of the script by the second probe and the third probe are staggered with respect to one another.

18. The system of claim 12, wherein the means for outputting an indication of an evaluation of an operation of the application comprises means for rating the application "available," only if each of a plurality of transaction steps in processing a request sent to the application is successful within a timeout period.

19. The system of claim 18, wherein:
the timeout period ranges from about 15 seconds to about 60 seconds.

20. The system of claim 12, wherein the first probe and second probe execute the script for measuring the at least one performance parameter for a plurality of applications executing on the first data processing device, wherein the same at least one performance parameter is measured for each of the plurality of applications, and wherein outputting an indication of an evaluation of an operation of the application comprises comparing measured performance parameters of the application with measured performance parameters of at least one other application executing on the first data processing device.

21. The system of claim 12, wherein the script executed by the first probe and the second probe measures the at least one performance parameter for each transaction step of a plurality of transaction steps of a transaction with the application.

22. The system of claim 21, wherein the means for outputting an indication of an evaluation of an operation of the application further comprises:
means for generating a table display output containing a plurality of table entries, one table entry for each transaction step in the transaction, wherein each table entry comprises a transaction step number, a transaction step name, and a description of an action an end user takes to execute the transaction step.

23. A computer program product in a computer-usable storage medium, the computer program product having computer-executable instructions, which when executed by a computing device, cause the computing device to evaluate an operation of an application executing on a data processing device, said computer-executable instructions comprising:
- instructions for setting threshold values for the at least one performance parameter;
- instructions for employing a plurality of probes comprising at least one local probe and at least one remote probe;
- instructions for measuring at least one performance parameter of the application using the at least one local probe that executes a script on a first data processing device on which the application executes, wherein the script measures the at least one performance parameter of the application;
- instructions for measuring the at least one performance parameter of the application using the at least one remote probe that executes the script on a second data processing device remotely located from the first data processing device on which the application executes, wherein execution of the script on the second data processing device causes transactions to be performed across at least one network;
- instructions for adjusting the measurements of the at least one performance parameter performed by the at least one remote probe to represent a type of network connection for communicating with the application that is common to end users of the application by converting measurement data using at least one conversion algorithm;
- instructions for mapping the measurements of the at least one performance parameter performed by the at least one local probe and the at least one remote probe to the threshold values; and
- instructions for outputting an indication of an evaluation of an operation of the application based on the mapping of the measurements of the at least one performance parameter performed by the at least one local probe and the at least one remote probe to the threshold values.

24. The computer program product of claim 23, wherein the at least one local probe and at least one remote probe measure the at least one performance parameter using measurement parameters that comprise at least one of:
- sampling interval;
- timeout period; and
- prerequisites for rating said application "available."

25. The computer program product of claim 24, wherein:
the sampling interval ranges from about 5 minutes to about 60 minutes.

26. The computer program product of claim 23, wherein the at least one performance parameter comprises at least one of a response time for at least one request sent to the application or a measurement of availability of the application.

27. The computer program product of claim 23, wherein said probes further comprise a plurality of remote probes.

28. The computer program product of claim 27, wherein times of execution of the script by the plurality of remote probes are staggered with respect to one another.

29. The computer program product of claim 23, wherein the means for outputting an indication of an evaluation of an operation of the application comprises means for rating the application "available," only if each of a plurality of transaction steps in processing a request sent to the application is successful within a timeout period.

30. The computer program product of claim 29, wherein:
the timeout period ranges from about 15 seconds to about 60 seconds.

31. The computer program product of claim 23, wherein the at least one local probe and at least one remote probe execute the script for measuring the at least one performance parameter for a plurality of applications executing on the first data processing device, wherein the same at least one performance parameter is measured for each of the plurality of applications, and wherein outputting an indication of an evaluation of an operation of the application comprises comparing measured performance parameters of the application with measured performance parameters of at least one other application executing on the first data processing device.

32. The computer program product of claim 23, wherein the script executed by the at least one local probe and the at least one remote probe measures the at least one performance parameter for each transaction step of a plurality of transaction steps of a transaction with the application.

33. The computer program product of claim 32, wherein the instructions for outputting an indication of an evaluation of an operation of the application further comprises:
- instructions for generating a table display output containing a plurality of table entries, one table entry for each transaction step in the transaction, wherein each table entry comprises a transaction step number, a transaction step name, and a description of an action an end user takes to execute the transaction step.

34. A method, in a distributed data processing system having at least one network, for evaluating an operation of an application executing on a data processing device, comprising:
- measuring at least one performance parameter of the application using a first probe that executes a script on a first data processing device on which the application executes, wherein the script measures the at least one performance parameter of the application;
- measuring the at least one performance parameter of the application using a second probe that executes the script on a second data processing device remotely located from the first data processing device on which the application executes, wherein execution of the script on the second data processing device causes transactions to be performed across the at least one network;
- adjusting the measurements of the at least one performance parameter performed by the second probe to represent a type of network connection for communicating with the application that is common to end users of the application by converting measurement data using at least one conversion algorithm;
- setting threshold values for the at least one performance parameter;
- mapping the measurements of the at least one performance parameter performed by the first probe and the second probe to the threshold values; and
- outputting an indication of an evaluation of an operation of the application based on the mapping of the measurements of the at least one performance parameter performed by the first probe and the second probe to the threshold values, wherein outputting an indication of an evaluation of an operation of the application further comprises:
    - comparing a first measurement of the at least one performance parameter performed by the first probe with a second measurement of the at least one performance parameter performed by the second probe;

identifying a performance of the at least one network based on the comparison of the first measurement with the second measurement; and determining if a performance problem of the application is a function of the application itself or of the at least one network based on the identified performance of the at least one network.

35. A system for evaluating an operation of an application executing on a data processing device, comprising:

means for setting threshold values for the at least one performance parameter;

a plurality of probes comprising at least one local probe and at least one remote probe;

means for measuring at least one performance parameter of the application using the at least one local probe that executes a script on a first data processing device on which the application executes, wherein the script measures the at least one performance parameter of the application;

means for measuring the at least one performance parameter of the application using the at least one remote probe that executes the script on a second data processing device remotely located from the first data processing device on which the application executes, wherein execution of the script on the second data processing device causes transactions to be performed across at least one network;

means for adjusting the measurements of the at least one performance parameter performed by the at least one remote probe to represent a type of network connection for communicating with the application that is common to end users of the application by converting measurement data using at least one conversion algorithm;

means for mapping the measurements of the at least one performance parameter performed by the at least one local probe and the at least one remote probe to the threshold values; and means for outputting an indication of an evaluation of an operation of the application based on the mapping of the measurements of the at least one performance parameter performed by the at least one local probe and the at least one remote probe to the threshold values, wherein the means for outputting an indication of an evaluation of an operation of the application further comprises:

means for comparing a first measurement of the at least one performance parameter performed by the first probe with a second measurement of the at least one performance parameter performed by the second probe;

means for identifying a performance of the at least one network based on the comparison of the first measurement with the second measurement; and means for determining if a performance problem of the application is a function of the application itself or of the at least one network based on the identified performance of the at least one network.

36. A computer program product in a computer-usable storage medium, the computer program product having computer-executable instructions, which when executed by a computing device, cause the computing device to evaluate an operation of an application executing on a data processing device, said computer-executable instructions comprising:

instructions for setting threshold values for the at least one performance parameter;

instructions for employing a plurality of probes comprising at least one local probe and at least one remote probe;

instructions for measuring at least one performance parameter of the application using the at least one local probe that executes a script on a first data processing device on which the application executes, wherein the script measures the at least one performance parameter of the application;

instructions for adjusting the measurements of the at least one performance parameter performed by the at least one remote probe to represent a type of network connection for communicating with the application that is common to end users of the application by converting measurement data using at least one conversion algorithm;

instructions for mapping the measurements of the at least one performance parameter performed by the at least one local probe and the at least one remote probe to the threshold values; and instructions for outputting an indication of an evaluation of an operation of the application based on the mapping of the measurements of the at least one performance parameter performed by the at least one local probe and the at least one remote probe to the threshold values, wherein the instructions for outputting an indication of an evaluation of an operation of the application further comprises:

instructions for comparing a first measurement of the at least one performance parameter performed by the at least one local probe with a second measurement of the at least one performance parameter performed by the at least one remote probe;

instructions for identifying a performance of the at least one network based on the comparison of the first measurement with the second measurement; and instructions for determining if a performance problem of the application is a function of the application itself or of the at least one network based on the identified performance of the at least one network.

37. A system, comprising:

a processor; and a memory coupled to the processor, wherein the memory contains instructions which, when executed by the processor, cause the processor to:

set threshold values for at least one performance parameter of an application;

receive measurements of at least one performance parameter of the application from a first probe that executes a script on a first data processing device on which the application executes, wherein the script measures the at least one performance parameter of the application;

receive measurements of at least one performance parameter of the application from a second probe that executes the script on a second data processing device remotely located from the first data processing device on which the application executes, wherein execution of the script on the second data processing device causes transactions to be performed across the at least one network;

adjust the measurements of the at least one performance parameter performed by the second probe to represent a type of network connection for communicating with the application that is common to end users of the application by converting measurement data using at least one conversion algorithm;

map the measurements of the at least one performance parameter received from the first probe and the second probe to the threshold values; and output an indication of an evaluation of an operation of the application based on the mapping of the measurements of the at least one performance parameter received from the first probe and the second probe to the threshold values, wherein the instructions cause the processor to output an indication of an evaluation of an operation of the application by:

comparing a first measurement of the at least one performance parameter performed by the first probe with a second measurement of the at least one performance parameter performed by the second probe;

identifying a performance of the at least one network based on the comparison of the first measurement with the second measurement; and determining if a performance problem of the application is a function of the application itself or of the at least one network based on the identified performance of the at least one network.

* * * * *